United States Patent
Whittemore et al.

(10) Patent No.: US 9,437,118 B2
(45) Date of Patent: Sep. 6, 2016

(54) FLEXIBLE AND RIGID ENDOSCOPIC TRAINING DEVICE (FRED)

(75) Inventors: Jacqueline C. Whittemore, Knoxville, TN (US); Katherine C. Kottkamp, Lake Toxaway, NC (US)

(73) Assignee: UNIVERSITY OF TENNESSEE RESEARCH FOUNDATION, Knoxville, TN (US)

( * ) Notice: Subject to any disclaimer, the term of this patent is extended or adjusted under 35 U.S.C. 154(b) by 208 days.

(21) Appl. No.: 13/496,244

(22) PCT Filed: Sep. 17, 2010

(86) PCT No.: PCT/US2010/049218
§ 371 (c)(1),
(2), (4) Date: Apr. 12, 2012

(87) PCT Pub. No.: WO2011/035088
PCT Pub. Date: Mar. 24, 2011

(65) Prior Publication Data
US 2012/0189997 A1    Jul. 26, 2012

Related U.S. Application Data

(60) Provisional application No. 61/243,567, filed on Sep. 18, 2009.

(51) Int. Cl.
*G09B 23/30* (2006.01)
*G09B 23/28* (2006.01)
*G09B 23/36* (2006.01)

(52) U.S. Cl.
CPC .............. *G09B 23/285* (2013.01); *G09B 23/30* (2013.01); *G09B 23/281* (2013.01); *G09B 23/288* (2013.01); *G09B 23/36* (2013.01)

(58) Field of Classification Search
CPC .............................. G09B 23/28; G09B 23/32
USPC .................................................. 434/262, 267
See application file for complete search history.

(56) References Cited

U.S. PATENT DOCUMENTS

| | | | | |
|---|---|---|---|---|
| 3,381,392 A | * | 5/1968 | Markman | G09B 23/285 359/804 |
| 3,520,071 A | * | 7/1970 | Clark | G06G 7/60 434/265 |
| 3,921,311 A | * | 11/1975 | Beasley | G09B 23/281 434/273 |
| 4,773,865 A | | 9/1988 | Baldwin | |
| 4,907,973 A | * | 3/1990 | Hon | G09B 23/285 434/262 |
| 5,006,089 A | * | 4/1991 | Lee | A63H 3/02 428/100 |

(Continued)

OTHER PUBLICATIONS

Written Opinion in International Application No. PCT/US2010/049218, Jun. 27, 2011, pp. 1-4.

*Primary Examiner* — Robert J Utama
(74) *Attorney, Agent, or Firm* — Saliwanchik, Lloyd & Eisenschenk

(57) ABSTRACT

An anatomically realistic model for training in minimally invasive procedures. The model includes an outer shell resembling the appropriate animal or human being with openings for accessing the interior cavity of the shell. Modules within the interior cavity are operably connected to the openings to permit external access to the modules. The modules comprise different mechanical components configured to represent an organ or anatomical feature. Spacers within the interior cavity provide structure and maintain placement of the modules and sufficiently realistic tactile feedback during an endoscopic procedure.

15 Claims, 9 Drawing Sheets
(9 of 9 Drawing Sheet(s) Filed in Color)

(56) References Cited

U.S. PATENT DOCUMENTS

| | | | | |
|---|---|---|---|---|
| 5,149,270 A | | 9/1992 | McKeown | |
| 5,769,640 A | * | 6/1998 | Jacobus | B25J 9/1689 434/262 |
| 5,800,178 A | * | 9/1998 | Gillio | G09B 5/14 434/262 |
| 5,823,787 A | * | 10/1998 | Gonzalez | G09B 23/28 434/265 |
| 5,846,087 A | * | 12/1998 | Scherer | G09B 23/285 434/267 |
| 5,957,694 A | * | 9/1999 | Bunch | G09B 23/36 434/262 |
| 6,857,878 B1 | * | 2/2005 | Chosack | G09B 23/285 434/262 |
| 8,403,675 B2 | * | 3/2013 | Stoianovici et al. | 434/262 |
| 8,480,408 B2 | * | 7/2013 | Ishii et al. | 434/273 |
| 8,764,450 B2 | * | 7/2014 | Pugh | G09B 23/30 434/262 |
| 2003/0091967 A1 | * | 5/2003 | Chosack | G06T 15/00 434/262 |
| 2005/0084833 A1 | * | 4/2005 | Lacey | A61B 90/36 434/262 |
| 2005/0214727 A1 | * | 9/2005 | Stoianovici | G09B 23/28 434/262 |
| 2007/0020598 A1 | * | 1/2007 | Yamashita | G09B 23/34 434/267 |
| 2008/0032273 A1 | * | 2/2008 | Macnamara | G09B 23/285 434/262 |
| 2008/0113324 A1 | * | 5/2008 | Ishii | A61B 17/00 434/272 |
| 2008/0299529 A1 | * | 12/2008 | Schaller | G09B 23/285 434/267 |
| 2009/0061404 A1 | * | 3/2009 | Toly | G09B 23/30 434/262 |
| 2009/0226868 A1 | | 9/2009 | Frassica et al. | |

* cited by examiner

FLEXIBLE AND RIGID ENDOSCOPIC TRAINING DEVICE (FRED)

CROSS-REFERENCE TO RELATED APPLICATION

This application claims the benefit of U.S. Provisional Application Ser. No. 61/243,567, filed Sep. 18, 2009, the disclosure of which is hereby incorporated by reference in its entirety, including all figures, tables and amino acid or nucleic acid sequences.

BACKGROUND OF INVENTION

Endoscopic techniques are routinely performed in small animal specialty practice for diagnosis and treatment of gastrointestinal, respiratory and urogenital disorders. Because these procedures are minimally invasive and cause little discomfort or complication for the clinical patient, their popularity and use in private practice has been increasing dramatically. Hundreds of veterinarians take continuing education workshops and purchase scope related equipment each year. Advanced training in the use of specialized equipment is necessary for use of this equipment. Additionally, significant practice is necessary to gain the dexterity and skill to successfully perform the procedures in a timely manner in clinical cases. In human medicine, endoscopists must demonstrate successful completion of a procedure using a simulator over 60 times before they are allowed to perform the procedure on a live human. Additionally, if they do not maintain a minimum caseload in the procedure, they may be required to re-train in order to renew their procedural certifications.

Veterinary training in the use and function of flexible and rigid endoscopes is currently often provided in the form of multiple day training workshops using live animals. In spite of the intensive focus, participants generally perform each procedure no more than twice. After completion of the workshops, practitioners return to their clinics where they employ their newly acquired skills on privately owned animals. Unless they obtain permission to practice on patients freshly euthanized for other reasons, they rarely have the opportunity to hone their skills further outside of actual clinical practice.

The animals used in teaching laboratories are generally terminated at the conclusion of the workshops because of the strain of prolonged anesthesia, damage sustained during training due to the initially steep learning curve for participants, and the number of participants performing each procedure on any given animal. Attempts to replace live animals with simulations for veterinary training have been hindered by technical difficulties in accurately replicating the live animal experience and ethical challenges.

Another difficulty is the necessity of having to clean or dispose of endoscopic devices after use with a cadaver or other living or once living tissue. For example, there are a variety of endoscopic devices for knot tying, grasping, cutting, or for performing other procedures that are not designed to be used on more than one patient, i.e., they are disposable. Because they cannot be cleaned, once they are used for a practice session on or within real tissue(s), their proper disposal is required. Many of these instruments are quite costly and using a new one for each training session can be expensive.

Unfortunately, there are a remarkable number of technical challenges in creating an animal surrogate for scoping. For example, the gastrointestinal tract is essentially a hollow and non-rigid tube that exists in a collapsed state except when filled with ingesta or fluid. It must be adequately insufflated with air to allow visualization of the internal surfaces of the esophagus, stomach, and intestine. Insufflation cannot be achieved in the gastrointestinal tract of cadavers because normal GI motility (muscular tone) is necessary to maintain closure of various sphincters and retain the insufflated air. As a result, the gastrointestinal tract remains collapsed and structures cannot be visualized. Unless procedures are performed immediately after euthanasia, cadavers must be stored frozen and then thawed for use. Inadequate thawing yields an immovable specimen with very poor tissue manipulation ability. Excessive thawing yields a specimen that has begun bloating with gas as it degrades; this also limits tissue manipulation. Most commonly, specimens will thaw patchily and be unsuitable for use. Finally, the availability of sufficient animal cadavers for use in a continuing education course is unreliable and may create incentive for potential suppliers of cadavers to prematurely euthanize adoptable animals.

Plastination of tissue specimens, wherein water and fats are removed from tissues and replaced with polymers, to create scope trainers has also been investigated. However, the significant friction of plastinated tissues can easily damage the outer sheath of flexible endoscopes, especially when the scopes are in the hands of novices. The lack of tissue pliability also creates significant torque on rigid endoscopes that can fracture the telescope lenses. In addition, the rigidity of such tissues prevents a true-to-life experience in the intricate and proper manipulation of the endoscope. Rather, the experience is more like pushing the endoscope through a rigid pipe. Hand-eye coordination and manipulative skills are not necessary to successfully navigate these surrogate GI tracts. The same tissue rigidity may prevent entry into the plastinated urinary tract entirely. Plastinated samples can be prepared after removal from cadaver animals and are scoped ex vivo, so the operator gains no appreciation for manipulation of the actual animal.

Although a variety of commercial simulators are available for training doctors and other medical professionals in different scoping procedures, they are cost prohibitive for veterinary training. The majority of human flexible scope trainers utilize computer simulation or virtual reality models of the gastrointestinal tract after the scope is inserted into the orifice of a rigid human facsimile. Such flexible endoscopy simulators often cost in excess of $100,000 per unit depending upon which simulations are chosen. Rigid scope trainers can be less expensive, but cost can still render them inaccessible for a veterinary educator.

There are other disadvantages for most of the commercial simulators currently being used. Most notable is their usual lack of transportability. Further, since most of them utilize computer simulations and/or force-feedback data, they usually require a dedicated computer system and related software which contribute not only to their cost but also to difficulty in transporting them.

Further, generally regarded as safe (GRAS) lubricants are often utilized during endoscopic procedures to facilitate movement of the instrument and aid in the comfort of the patient. The use of such lubricants must be judicious so as to not interfere with the endoscope images. With most computer simulated or virtual reality simulators, the use of lubricants is not possible because they are not usually designed to be cleaned. Thus, doctors and medical professionals that utilize such training devices will not gain experience in the use of lubricants during a procedure.

For veterinary continuing education purposes, at least six of any flexible or rigid training unit would be necessary. The high cost of most commercial trainers makes them financially inaccessible for veterinary colleges and certainly not an option for practitioners that wish to obtain ongoing practice in techniques they have acquired at workshops.

BRIEF SUMMARY

The subject invention provides a Flexible and Rigid Endoscopic training Device (FRED) that can be utilized to simulate endoscopic procedures on an animal or human. The advantages of the FRED, which will become apparent from the following disclosure, reside in its being able to provide realistic and inexpensive visual and tactile feedback without the necessity of a dedicated computer or software programs.

The FRED is an anatomically realistic veterinary training tool for the practice of minimally invasive procedures. The external covering of the FRED can mimic any of a variety of animals, including a human being, or utilize a generalized outward appearance and includes a closable opening to the interior. Internally, various modules and components that simulate internal organs and/or systems can be arranged and operably attached depending upon the type of procedure to be simulated. Advantageously, it has been found that common, generally inexpensive devices and apparatuses can be used to assemble the modules and components to provide sufficiently realistic visual and tactile feedback during training. In accordance with the invention, the necessity for a reusable, cleanable, inexpensive, yet realistic training model is solved by utilizing a stand alone model that can be easily transported for use in a variety of locations and with any endoscopic device and that can disassembled for cleaning. The present invention is particularly advantageous in that it provides an inexpensive model, mechanically comparable to actual tissue, for practicing endoscopic procedures. Training performed with the present invention does not require living volunteers, patients or cadavers. Increased practice of endoscopic methods before they are employed on a patient cannot help but to reduce the risk of injury to the patient from the performance of such procedures. The discovery of improvements to the steps involved in such procedures should also be facilitated by increased training and practice in such procedures.

BRIEF DESCRIPTION OF DRAWINGS

In order that a more precise understanding of the above recited invention can be obtained, a more particular description of the invention briefly described above will be rendered by reference to specific embodiments thereof that are illustrated in the appended drawings. It should also be understood that the drawings presented herein may not be drawn to scale and that any reference to dimensions in the drawings or the following description are specific to the embodiments disclosed. Any variations of these dimensions that will allow the subject invention to function for its intended purpose are considered to be within the scope of the subject invention. Thus, understanding that these drawings depict only typical embodiments of the invention and are not therefore to be considered as limiting in scope, the invention will be described and explained with additional specificity and detail through the use of the accompanying drawings.

The patent or application file contains at least one drawing executed in color. Copies of this patent or patent application publication, with color drawing(s), will be provided by the Office upon request and payment of the necessary fee.

DETAILED DISCLOSURE

Figure 1:
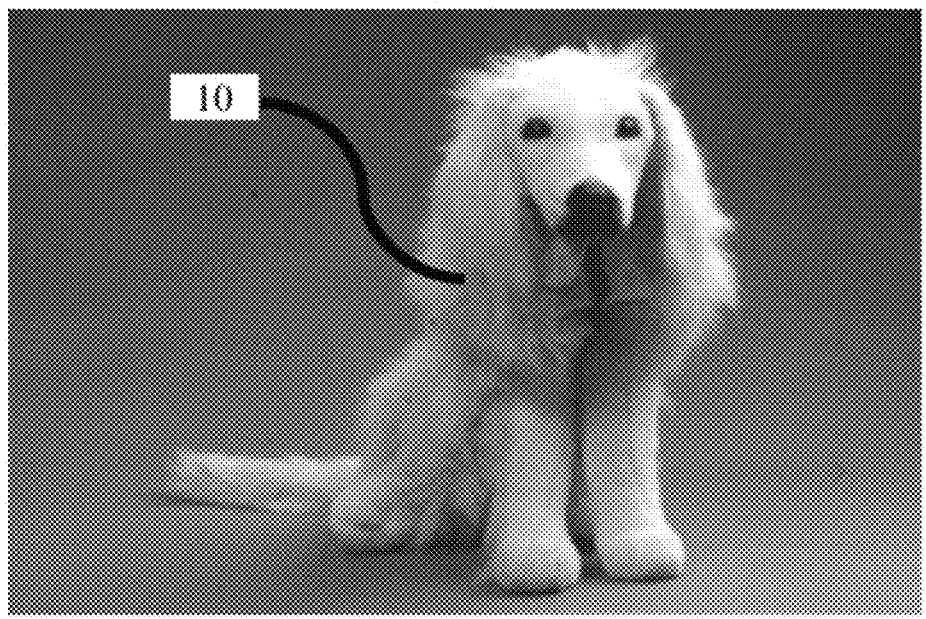
FIG. 1 shows an embodiment of the training device of the subject invention in a sitting position.

One aspect of the invention, in general, describes a Flexible and Rigid Endoscopic training Device (FRED). More specifically, the subject invention pertains to one or more embodiments of an endoscopic simulator, model, or similar device, capable of providing realistic visual and tactile feedback when utilized for training in endoscopic procedures.

The following description will disclose that the subject invention is particularly useful in the field of human and veterinary training of endoscopic procedures. However, a person with skill in the art will be able to recognize numerous other uses that would be applicable to the devices and methods of the subject invention. While the subject application describes a use for training in gastrointestinal endoscopic procedures, modifications for other types of training will be apparent to a person with skill in the art having benefit of the subject disclosure and such modifications are contemplated to be within the scope of the present invention.

Also, as used herein, and unless otherwise specifically stated, the terms "operable communication", "operable connection", "operably connected" or variations thereof mean that the particular elements are connected in such a way that they cooperate to achieve their intended function or functions. The "connection" may be direct, or indirect, physical or remote.

The present invention is more particularly described in the following examples that are intended to be illustrative only since numerous modifications and variations therein will be apparent to those skilled in the art. As used in the specification and in the claims, the singular for "a," "an" and "the" include plural referents unless the context clearly dictates otherwise.

With reference to the attached figures, which show certain embodiments of the subject invention, it can be seen that the subject invention can employ an exterior shell 10, which can act as a cover. In a particular embodiment, the shell is in the shape of an animal. One specific embodiment, seen in FIG. 1, has the form of a dog externally, but in other embodiments other animal species or human forms may also be utilized. In a still further embodiment, the external shell appearance is a generalized animal shape.

The FRED exterior can be made of any of a variety of materials, including, but not limited to, cloth, fur, vinyl, plastic, rubber, paper or other wood products, nylon, or combinations thereof, or any other suitable material needed to mimic the appearance of the natural state of the animal. In one embodiment, the shell is a soft, pliable, flexible covering. In an alternative embodiment, the shell is a rigid or semi-rigid covering. In one embodiment, at least some portion of the FRED's limbs are designed to be stiff or rigid or semi-rigid, allowing the device to either sit or be placed in a supine or lateral position. In an alternative embodiment, limbs are optional and, thus, may not be present on all models. In one embodiment, FRED has reinforced or semi-stiff chest and abdominal walls so it will maintain normal outward anatomy when placed on his side, stomach or back.

Figure 2:
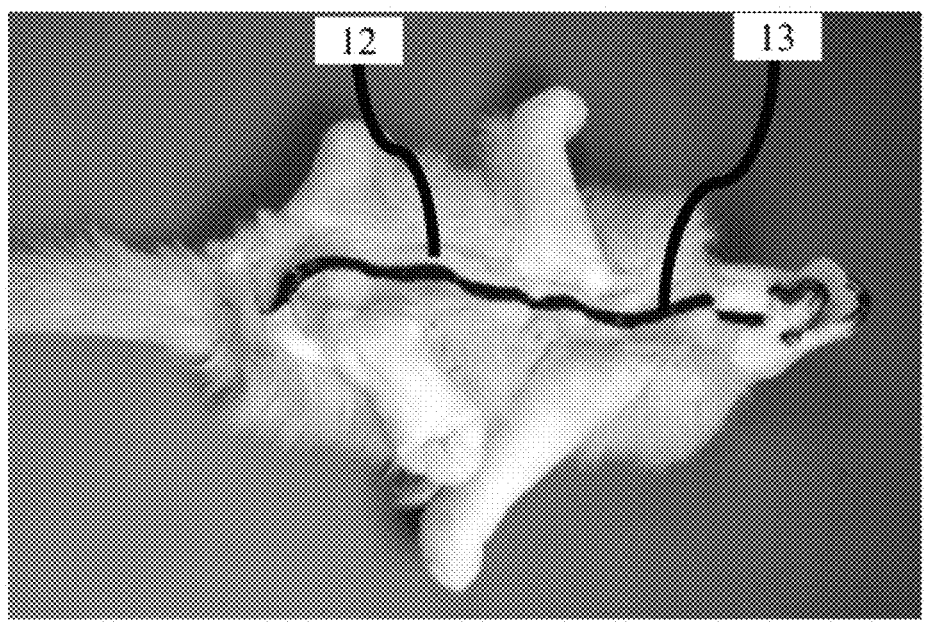
FIG. 2 shows an embodiment of the training device of the subject invention in a supine position. In this embodiment, a zipper closure is utilized to secure the opening.

In order to facilitate access to the interior cavity 11 of the model, the FRED includes an interior access opening 12 through which various components and modules can be placed and/or removed. The interior access opening can be located in any convenient location on the model. In a particular embodiment, the interior access opening is sufficiently large enough to enable placement and operable attachment, where necessary, of different modules, as will be explained below. FIG. 2 illustrates an embodiment wherein the interior access opening 12 extends anteriorly to posteriorly along the ventral side of the animal model. In this embodiment, the interior access opening extends from approximately the mandibular region of the model animal to approximately the anus.

The interior access opening 12 can be closed and secured by any means known to those with skill in the art, including but not limited to, snaps, ties, eyelets, slider zippers, magnetic closures, buttons, or combinations thereof. In a specific embodiment, shown, for example, in FIG. 2, the opening is secured with a standard zipper 13.

Figure 3:
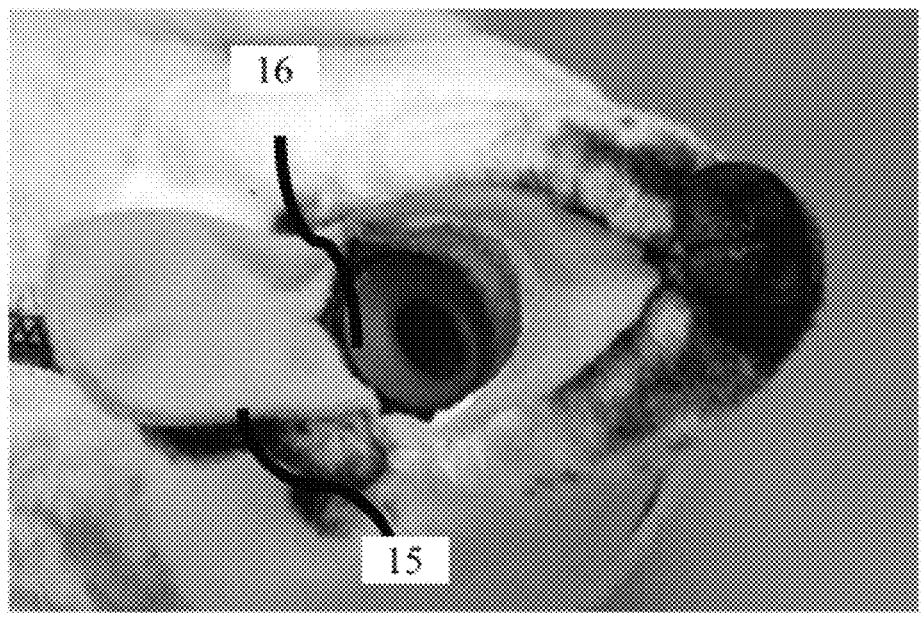
FIG. 3 shows the embodiment of FIG. 2 with the oral orifice with gastrointestinal tract in place. Other embodiments may include a respiratory tract opening adjacent to, or in place of, the gastrointestinal tract.

Many endoscopic procedures are initiated through an external orifice 14 of an animal. In one embodiment, a movable mouth 15 with oral orifice 16 is present, an example of which can be seen in FIG. 3. The oral orifice 16 can be used to provide external access by endoscopic or other devices to removable respiratory and gastrointestinal tract training modules, as explained below. In one embodiment, the oral orifice 16 comprises a rigid or semi-rigid tubular opening that extends from the exterior of the movable mouth 15 to the interior of the shell 10. In a further embodiment, the oral orifice 16 extends a sufficient distance into the shell to facilitate operable attachment to other training modules, such as, for example, the respiratory and/or gastrointestinal tract training modules. In one embodiment, the oral orifice 16 can operably attach to a single training module. In an alternative embodiment, the oral orifice 16 can simultaneously operably attach to more than one training module.

Figure 4:
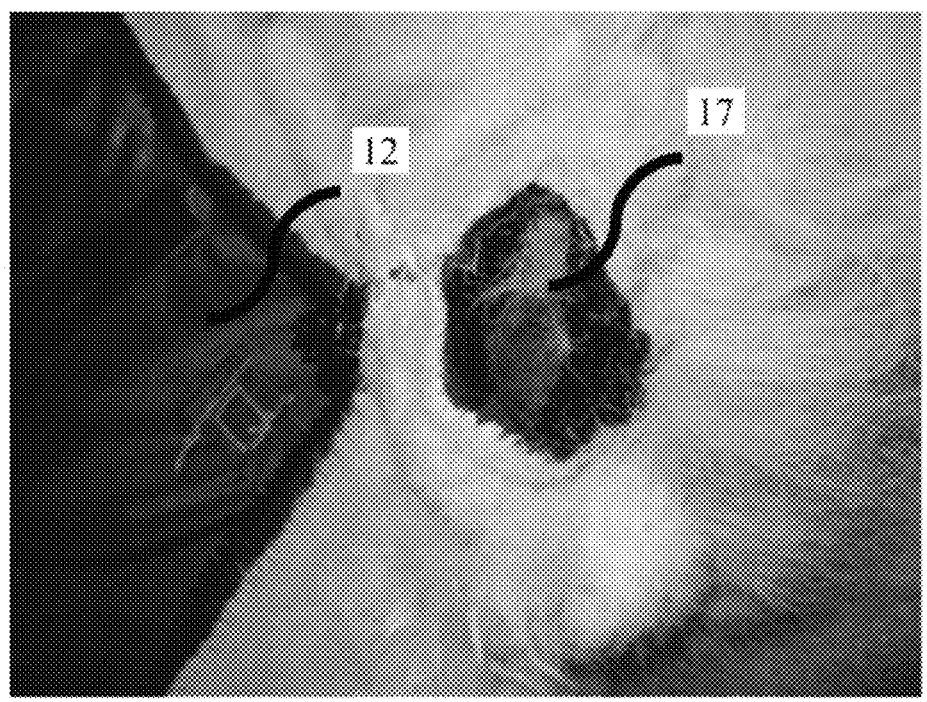
FIG. 4 shows the embodiment of FIG. 2 wherein the rectal orifice features a VELCRO (hook and loop closure system) rim for operable attachment of removable modules. Other embodiments may not utilize rectal attachment devices or may utilize other types of rectal attachment devices. Other embodiments may include a urinary tract orifice or attachment device.

Other endoscopic procedures are initiated through rectal 17 or urinary openings. In one embodiment, the FRED includes rectal (FIG. 4) and urinary openings that provide access to removable gastrointestinal and urinary tract modules. In further embodiments, the oral orifice, rectal and urinary openings can include materials or devices that permit operable attachment of removable training modules either interiorly or exteriorly, as necessary. In a further embodiment, one or more openings can be included in the shell 10 to represent "keyhole" openings as employed for other types of endoscopic procedures. In a further embodiment, the openings and/or orifices can be closable. But, in an alternative embodiment, the openings and/or orifices are not closable.

Figure 5:
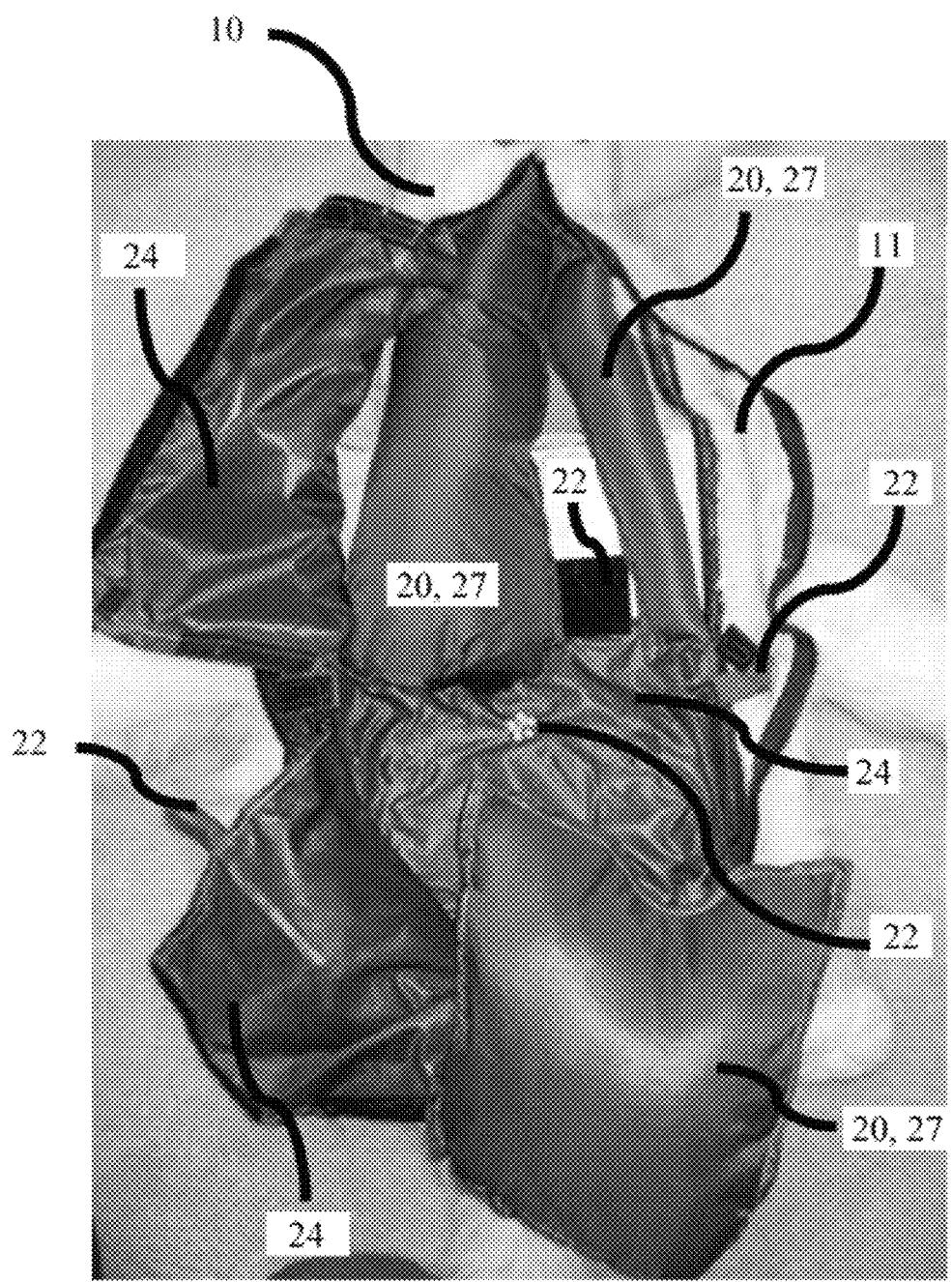
FIG. 5 shows an embodiment of the internal arrangement of the training device of the subject invention. In this embodiment, as shown in the top half of the image, are a removable fabric panel, two lung spacers, and VELCRO attachment points. Featured in the bottom half of the image are a removable fabric panel, a mesenteric spacer, reclosable VELCRO loops and button closures. An elastic band attachment is also present on the left side of the abdomen (not shown).

In a further embodiment, one or more modules 20 can be positioned in the interior cavity 11 of the shell 10 through the interior access opening 12. The modules 20 can include a variety of different types of attachment mechanisms and/or panels to which different modules can be operably attached or removed as necessary (FIG. 5). The attachments and panels assist in securing the position of the modules in a realistic configuration.

To secure the position of different modules in the interior cavity 11, any of a variety of attachments 22 can be utilized with the FRED of the subject invention, including, but not limited to, loops with VELCRO (hook and loop) closures, elastic bands, button and loop closures, and direct VELCRO attachments, snaps, buttons, zippers or other such materials that allow for securing of modules, spacers, and other items. A person with skill in the art would be able to determine any of a variety of attachment techniques and devices that can be utilized with the modules of the subject invention. Such variations are considered to be within the scope of the subject invention.

In a further embodiment, one or more panels 24 can be utilized in the interior cavity 11 to assist with placement and securing of the one or more modules 20. The panels 24 can assist with maintaining the placement of one or more modules in the interior cavity 11 to ensure that the modules present a realistic and accurate training experience. In one embodiment, the panels surround one or more modules and are secured by any of a variety of attachments devices to the interior cavity 11. In a further embodiment, the panels are designed to apply sufficient pressure to the modules to mimic the proximity and pressure that would be experienced with organs of a living animal. FIG. 5 illustrates one embodiment having two or more panels 24 that are utilized to surround the anterior and posterior modules. When properly operably attached to the interior cavity 11 the panels 24 hold the modules 20 in proper alignment and proximity within the interior cavity 11. The panels are also able to lend the outside appearance of the shell 10 a more uniform appearance rather than one that is lumpy and unrealistic.

The modules 20 can comprise any of a variety of materials suitable for their intended function. In certain instances, as will be discussed below, various natural or synthetic lubricants, water, dyes, or other substances may be utilized during a training session. Thus, it can be necessary to periodically clean the modules and panels. In one embodiment, the panels are made of synthetic water resistant fabric. The use of a water resistant material can ensure that any leakage that occurs within the components of the module from the lubricant, or any other substance, utilized during the procedure, is maintained within the module to avoid contamination or soiling of surrounding modules or the interior cavity 11. In an alternative embodiment, the panels comprise a washable material, such that any leakage of lubricant or other substance can be cleaned from the modules or panels. The panels can also be made from other types of materials, such as, for example, cloth, vinyl, plastic, nylon, rubber, or other suitable materials. In alternative embodiments, panels may not be included or present.

As mentioned above, modules 20 are utilized within the interior cavity 11 to mimic and/or represent various organs, tissues, or structures in an animal or human. The modules can comprises any of a variety of shapes or configurations required to adequately represent the organs, tissues or structures.

In one embodiment, certain modules, referred to herein as spacers 27 can be filled with a bulk material, such as, for example, polyester filling or foam, tissue paper, cloths, filling, rubber, plastic polymers, leather, vinyls or other such material. In an alternative embodiment, the spacer comprises an air-filled balloon or similar structure. Within the interior cavity 11, a spacer 27 can create a solid or hollow, rigid or soft, space-occupying structure. Modules can be interchangeable depending upon the training needs. In one embodiment, one or more spacers can be utilized to provide realistic rigidity and resistance that would be experienced during a normal procedure. Spacers can also be employed to maintain normal placement of various modules within the interior cavity 11.

Modules of the subject invention are designed to provide an acceptably realistic training experience for specific endoscopic procedures at minimal cost. Advantageously, it has been found that the use of common, structurally similar, components and materials can provide a realistic training experience, particularly when combined with the use of spacer 27 modules, described above.

Figure 6:
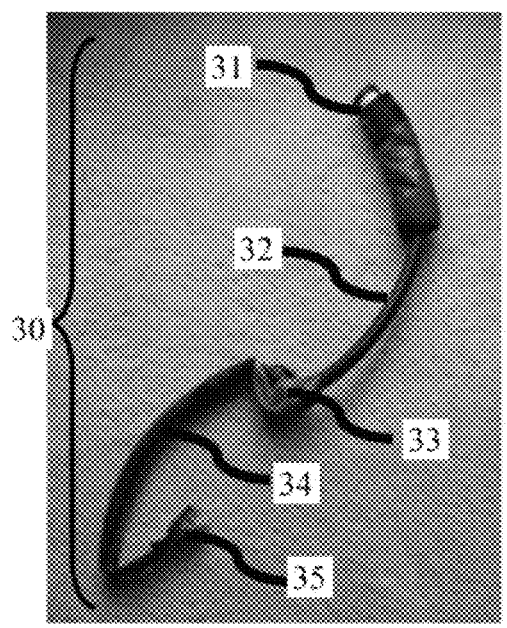
FIG. 6 shows an embodiment of a removable upper gastrointestinal tract shown with removable esophageal spacer in place that can be utilized with the subject invention. Moving top to bottom, the esophagus, stomach and duodenum with removable closure are shown.
Figure 7:
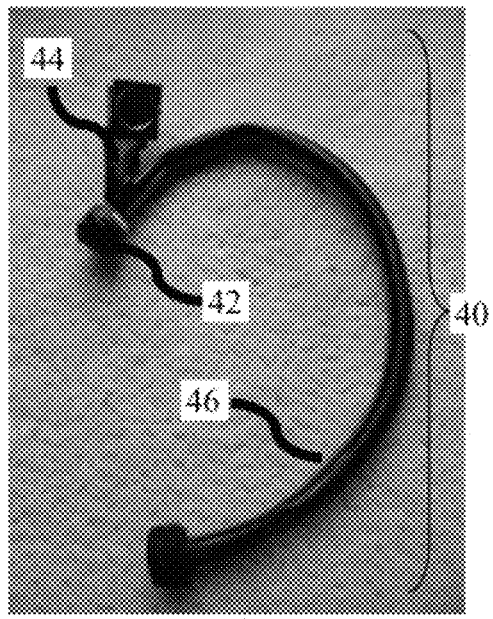
FIG. 7 shows an embodiment of a removable lower gastrointestinal tract that can be utilized with the subject invention. Moving top to bottom, the ileocolic junction, cecum with removable closure, and colon are shown.
Figure 8:
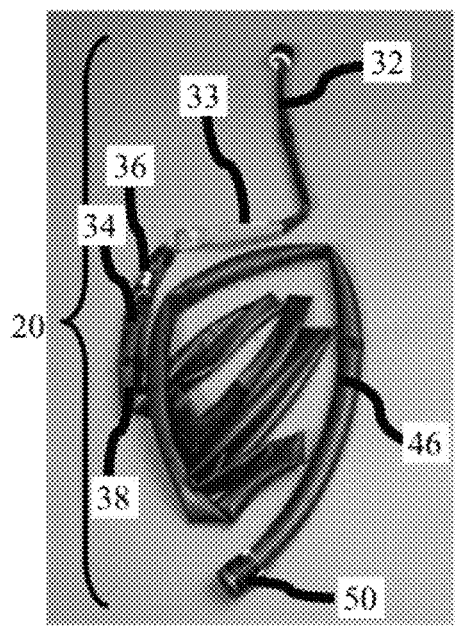
FIG. 8 shows an embodiment of a contiguous intestinal tract. Moving top to bottom, the esophagus, stomach, duodenum with common bile duct port, jejunum, and colon are shown.

In a specific embodiment, the subject invention comprises training modules having common components that mimic upper and lower gastrointestinal tracts (FIGS. 6-8). In one embodiment, the esophagus 32, duodenum 34, cecum 44 and colon 46 comprise simple tubular structures. In a particular embodiment, the tubular structures are synthetic tubes that are made of latex. In an alternative embodiment, the components 32, 34, 44 and 46 are made of other natural or synthetic materials including, but not limited to, rubber, plastic polymers, leather, vinyls or other such material that renders the tube flexible, expandable and airtight.

In a further specific embodiment, the upper esophageal sphincter 31 and rectum 50 are reinforced with polyvinylchloride (PVC) pipe. In alternative embodiments, reinforcement of the esophageal sphincter 31 and rectum 50 is achieved with the use of other natural or synthetic materials or may not be included.

Figure 9:
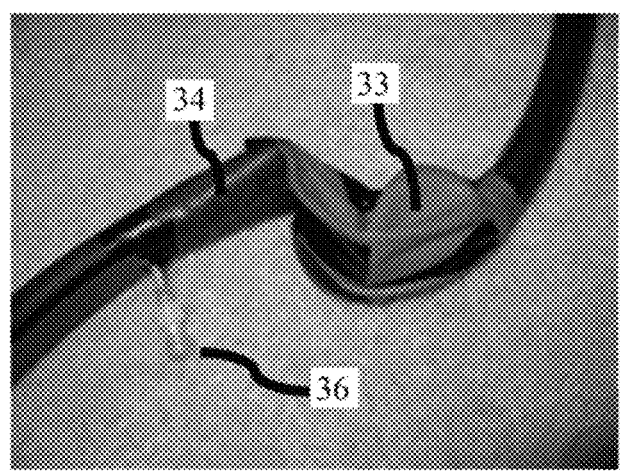
FIG. 9 shows an embodiment of a stomach, proximal duodenum and port for the common bile duct that can be utilized with the subject invention.
Figure 10:
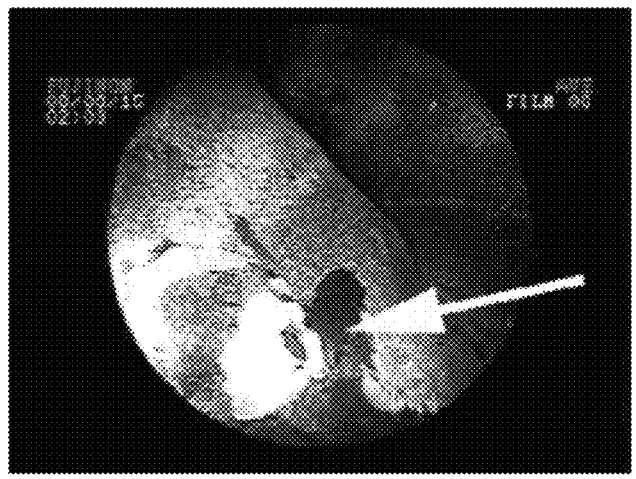
FIG. 10 shows an image taken by endoscope demonstrating the luminal appearance of the common bile duct (indicated by white arrow) as seen in an embodiment of the subject invention.
Figure 11:
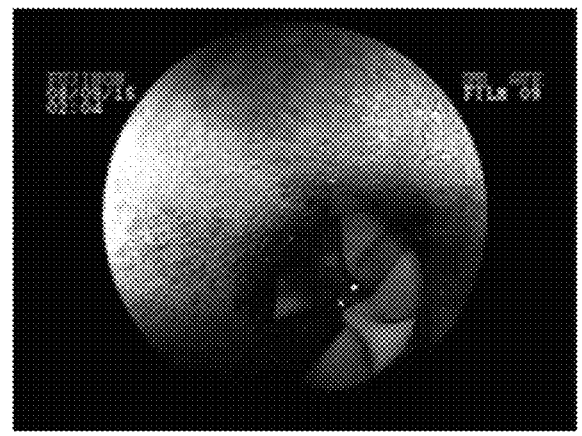
FIG. 11 shows an endoscopic image of the juncture of the lower esophagus with the stomach, as seen in an embodiment of the subject invention. In this image, the appearance is consistent with a relaxed lower esophageal sphincter.
Figure 12:
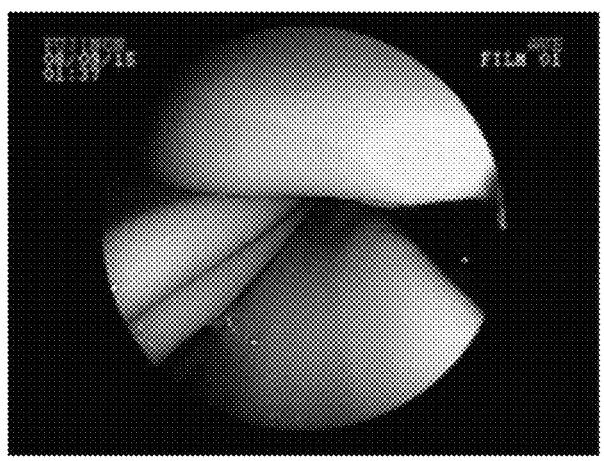
FIG. 12 shows an endoscopic image of the stomach as seen in an embodiment of the subject invention. In this image the prominent rugal folds are shown prior to insufflation. Note the similarities to the image in FIG. 16.
Figure 13:
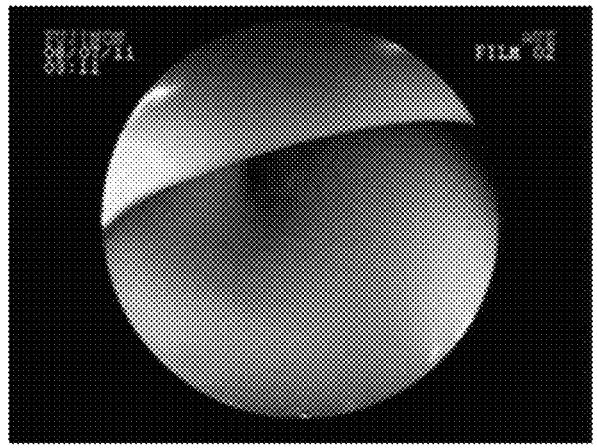
FIG. 13 shows an endoscopic image of the lesser incisura (upper line) and the beginning of the pyloric outflow tract, as seen in an embodiment of the subject invention. Note the similarities to the image in FIG. 17.
Figure 14:
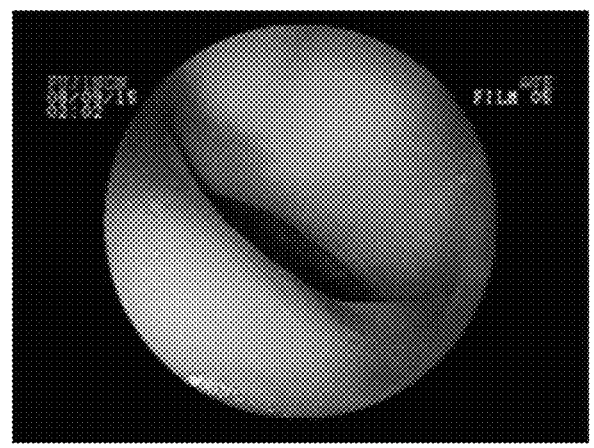
FIG. 14 shows an endoscopic image of the pylorus curving away from the scope, as seen in an embodiment of the subject invention.
Figure 15:
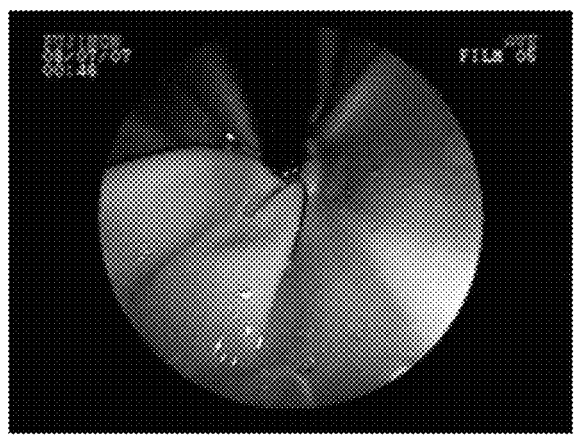
FIG. 15 shows an endoscopic image of the antrum of the stomach, as seen in an embodiment of the subject invention. This is a retroflexed view where the scope is visualized entering the stomach. Note the similarities to the images in FIGS. 16 and 17.
Figure 19:
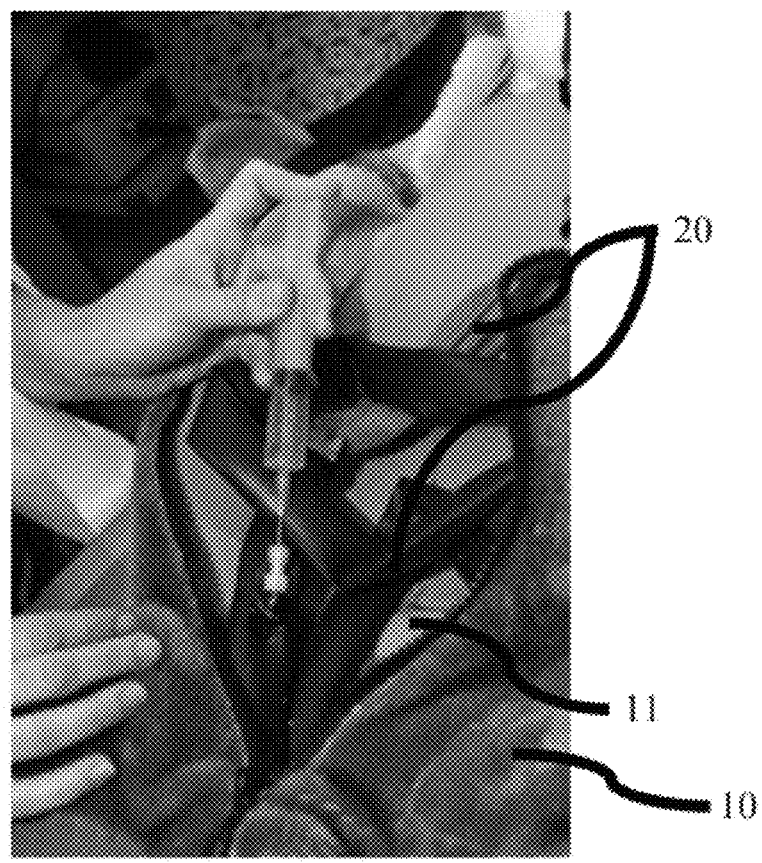
FIG. 19 shows the introduction of lubricant into intestinal tract of an embodiment of the subject invention utilizing the common bile duct port (FIGS. 8 and 9).
Figure 20:
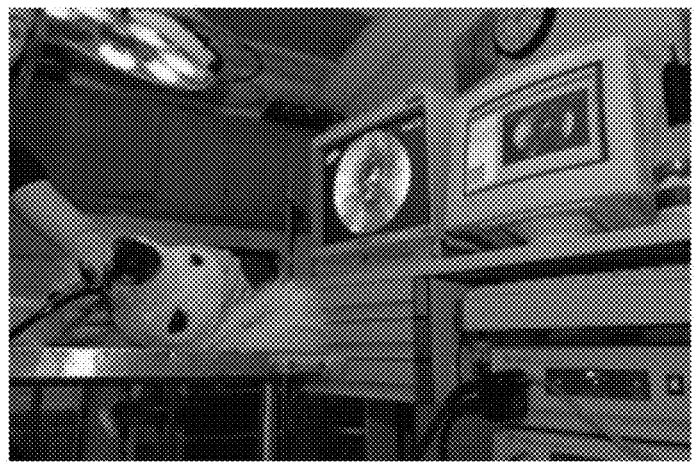
FIG. 20 shows an image demonstrating the normal anatomic positioning of an embodiment of the subject invention for endoscopic evaluation of the upper gastrointestinal tract.
Figure 21:
FIG. 21 shows an image demonstrating the normal anatomic positioning and handling of an embodiment of the subject invention during endoscopic evaluation of the upper gastrointestinal tract.
Figure 22:
FIG. 22 shows an image demonstrating the normal anatomic positioning and handling of an embodiment of the subject invention during endoscopic evaluation of the upper gastrointestinal tract.

In a specific embodiment, the duodenum 34 has a fenestration to mimic the appearance and function of the common bile duct 36 (FIGS. 9 and 10). In alternative embodiments, the fenestration may not be included. The outer aspect of the bile duct 36 is sized to allow operable attachment of a syringe, needle or other device for introduction of lubricant into the intestinal tract, as shown, for example, in FIG. 19. The duct can be closed when not in use as a lubricant port so that an airtight seal is maintained. In a further embodiment, the distal aspect of the duodenum 34 and proximal aspect of the colon 46 can be opened and separated for through and thorough cleaning of the intestinal tract module, seen, for example, in FIGS. 6 and 7, but, in an alternative embodiment, they are permanently closed or continuous with the lower intestinal tract, as seen, for example, in FIG. 8.

In a further specific embodiment, the stomach 33 of the subject invention, an example of which can be seen in FIG. 9, is a round structure with gastric folds made from a latex balloon. The stomach can also be made of other natural or synthetic materials including but not limited to rubber, plastic polymers, leather, vinyls or other suitable material that renders the stomach flexible, expandable and airtight while providing the appearance of normal rugal folds and gastric anatomy. In one embodiment, the stomach is made separately from the other parts of the intestinal tract and operably attached after manufacture. In an alternative embodiment, the stomach is formed contiguously with all or part of the gastrointestinal tract.

Other embodiments can include removable training modules modeled after, for example, but not limited to, the female urinary tract, lungs with upper respiratory tract, and heart with pericardial sac. The ability to remove and/or alter the modules within the interior cavity of the FRED allows it to be used for a variety of procedures as well. Utilizing these additional training modules, a variety of procedures can be trained and/or practiced with the FRED. By way of non-limiting examples, gastrointestinal endoscopy (esophago-, gastro-, duodeno-, and colonoscopy), bronchoscopy, transtracheal wash, urethro-cystoscopy, pericardiocentesis, laparoscopy, esophageal stricture dilation and injection, and percutaneous endoscopic gastrostomy (PEG) placement are a few of the procedures that can be practiced with the FRED of the subject invention having appropriate modules.

In a particular embodiment, modules are designed to be cleaned and replaced, allowing for repeated usage. An alternative embodiment utilizes single or limited use disposable modules that are not designed to be cleaned.

The FRED of the subject invention can address three important veterinary and human medical market niches. Firstly, the FRED will provide a realistic training model for teaching colleges to decrease the use of live animals and cadavers in continuing education courses. Colleges could also purchase multiple FREDs to significantly minimize their live animal and cadaver usage and costs for training students. The FRED's repeated usability and versatility make it well-suited and cost-effective for a variety of commonly performed procedures. Second, private practitioners could afford to purchase a FRED to practice recently learned minimally invasive procedures prior to clinical implementation. Third, the FRED may be used by manufacturers of minimally invasive equipment as a demonstration tool. Fred's initial market application will be as a tool for flexible and rigid endoscopy though a variety of additional modules will be available for individual sale.

EXAMPLE 1

Endoscopic Images of a Gastrointestinal Tract Module Utilized in a FRED

Figure 16:
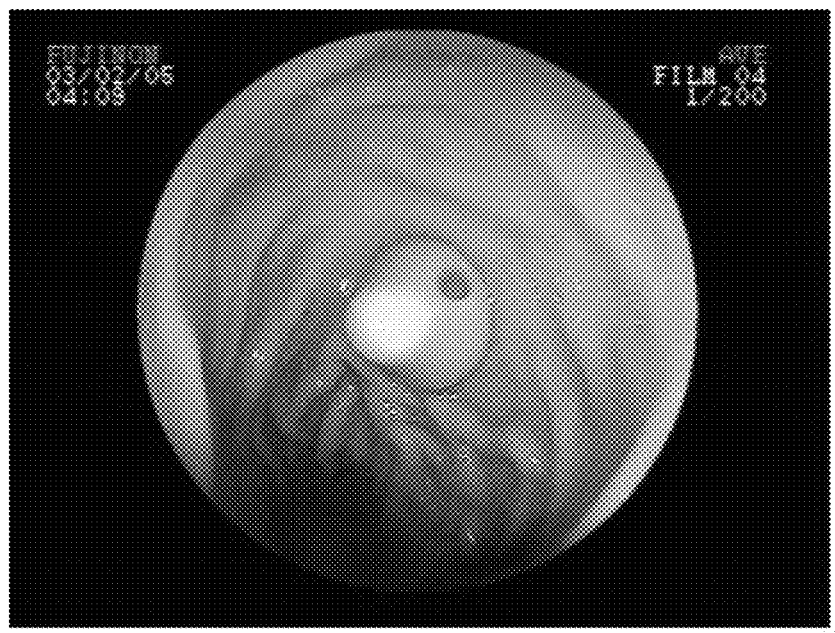
FIG. 16 shows an endoscopic image of the interior of a canine stomach with a feeding tube in place.
Figure 17:
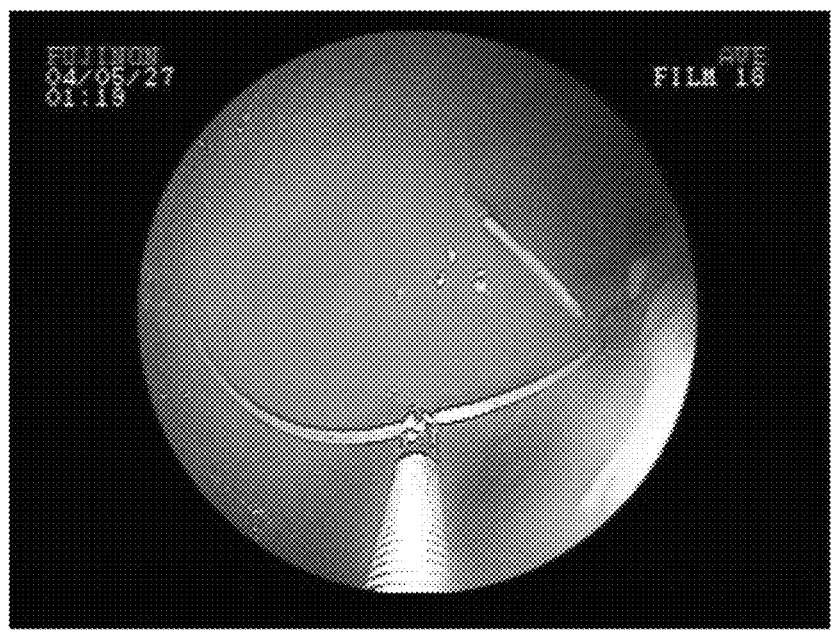
FIG. 17 shows an endoscopic image of the interior of a canine stomach.

It has been shown through several trials, that the FRED of the subject invention employing a gastrointestinal tract module is effective and sufficiently realistic for training in endoscopic procedures. By way of example, FIGS. 11 through 15 represent the most commonly taken endoscopic views of the stomach, as visualized using the FRED of the subject invention. For comparison, FIGS. 16 and 17 are endoscopic images of the stomach interior of a living animal (with a feeding tube in place). It can be seen that the images are sufficiently similar to facilitate realistic and accurate training of endoscopic procedures.

Figure 18:
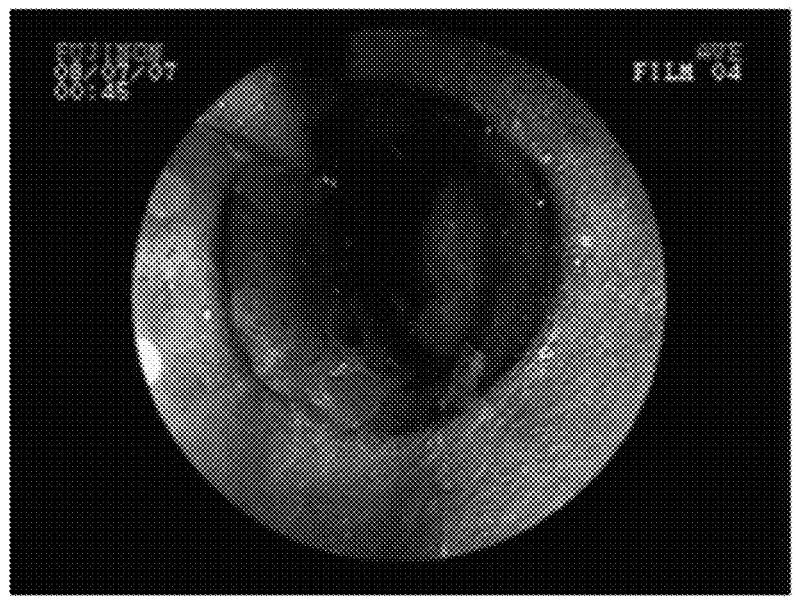
FIG. 18 shows an endoscopic image of the esophagus, as seen in an embodiment of the subject invention.

FIG. 18 is a representative endoscopic image of the subject FRED esophagus. The colon and duodenum are similarly sufficiently realistic.

EXAMPLE 2

Use of the FRED for endoscopic procedure

FIGS. 19 through 22 demonstrate usage of the FRED of the subject invention to practice endoscopy. As can be seen, the FRED can be positioned and manipulated like an actual dog for all procedures. The FRED can also be placed in a sitting position, as shown in FIG. 1 or in other recumbent positions for practice of other technical procedures including but not limited to transtracheal wash, pericardiocentesis, bronchoscopy, and cystoscopy.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

It should be understood that any reference in this specification to "one embodiment," "an embodiment," "example embodiment," "further embodiment," "alternative embodiment," etc., is for literary convenience. The implication is that any particular feature, structure, or characteristic described in connection with such an embodiment is included in at least one embodiment of the invention. The appearance of such phrases in various places in the specification does not necessarily refer to the same embodiment. Further, when a particular feature, structure, or characteristic is described in connection with any embodiment, it is submitted that it is within the purview of one skilled in the art to affect such feature, structure, or characteristic in connection with other ones of the embodiments.

We claim:

1. An anatomically realistic model for training personnel in endoscopic and other medical procedures, the model comprising:
   a shell resembling an animal, the shell having an interior cavity;
   at least one removable module positioned in the interior cavity of the shell that mimics realistic function, proximity, and pressure of organs of a living animal;
   openings for accessing orifices and body cavities in the animal;
   one or more spacers that maintain normal placement of the at least one removable module within the interior cavity and provide realistic rigidity and resistance that would be experienced during a medical procedure on a living animal;
   one or more panels designed to apply sufficient pressure to the at least one removable module to mimic the proximity and pressure of normal surrounding tissues in a living animal on the at least one removable module as that which would be experienced by the organs of the living animal; and
   wherein said model simulates normal function and behavior of the living animal when the animal is used for practicing a medical procedure and is anatomically realistic.

2. The model of claim 1, wherein the shell resembles the outward appearance of a mammal.

3. The model of claim 1, wherein the opening is an oral orifice.

4. The model of claim 1, wherein the opening is a rectal orifice.

5. The model of claim 1, wherein the at least one removable module represents a gastrointestinal system.

6. The model of claim 1, wherein the at least one removable module is selected from upper airway tract, lower airway tract, esophagus, heart with pericardial sac, stomach, duodenum, colon, jejunum, bile duct, ileocolic junction, ileum, cecum, colon, upper intestinal tract, lower intestinal tract, urinary tract, or reproductive tract.

7. The model of claim 1, wherein said model is transportable.

8. The model of claim 1, wherein said model is made from a synthetic material.

9. The model of claim 2, wherein said model is a dog or a human.

10. The model of claim 1, wherein the model comprises more than one organ system.

11. An anatomically realistic model for training personnel in endoscopic and other medical procedures, the model consisting of:
- a shell resembling an animal, the shell having an interior cavity;
- at least one removable module positioned in the interior cavity of the shell that mimics realistic function, proximity, and pressure of organs of a living animal;
- openings for accessing orifices and body cavities in the animal;
- one or more spacers that maintain normal placement of the at least one removable module within the interior cavity and provide realistic rigidity and resistance that would be experienced during a medical procedure on a living animal;
- one or more panels designed to apply sufficient pressure to the at least one removable module to mimic the proximity and pressure on the at least one removable module that would be experienced by the organs of the living animal; and
- wherein said model simulates normal function and behavior of the living animal when the animal is used for practicing a medical procedure and is anatomically realistic.

12. The anatomically realistic model according to claim 1, said model simulates normal function and behavior of the living animal when the animal is used for practicing a medical procedure, is anatomically realistic and wherein manipulation of the shell and internal modules of the model in a manner used to manipulate a living animal can be performed and results in realistic functional responses by the model.

13. The anatomically realistic model of claim 11, said model simulates normal function and behavior of the living animal when the animal is used for practicing a medical procedure, is anatomically realistic and wherein manipulation of the shell and internal modules of the model in a manner used to manipulate a living animal can be performed and results in realistic functional responses by the model.

14. The anatomically realistic model of claim 1, wherein the animal is a non-human animal.

15. The anatomically realistic model of claim 11, wherein the animal is a non-human animal.

* * * * *

UNITED STATES PATENT AND TRADEMARK OFFICE
CERTIFICATE OF CORRECTION

PATENT NO.        : 9,437,118 B2                           Page 1 of 1
APPLICATION NO.   : 13/496244
DATED             : September 6, 2016
INVENTOR(S)       : Whittemore et al.

It is certified that error appears in the above-identified patent and that said Letters Patent is hereby corrected as shown below:

In the Specification

Column 1,
Line 7, delete "This application claims" and insert
--This application is the U.S. national stage application of International Patent
Application No. PCT/US2010/049218, filed September 27, 2010, which claims--.
Line 9, delete "disclosure of which is" and insert --disclosures of which are--.
Line 10, delete "its entirety," and insert --their entireties,--.

Signed and Sealed this
Twenty-first Day of February, 2017

Michelle K. Lee
*Director of the United States Patent and Trademark Office*